June 17, 1930.  E. KNECHT  1,763,792
ADJUSTABLE WINDING SPINDLE FOR SPRING MOTORS
Filed March 26, 1928
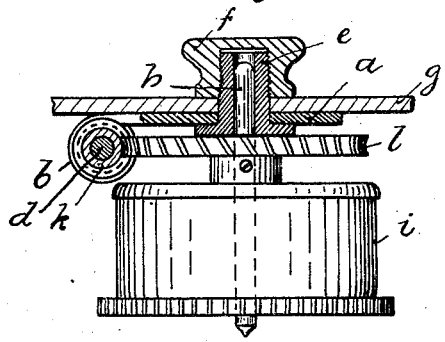
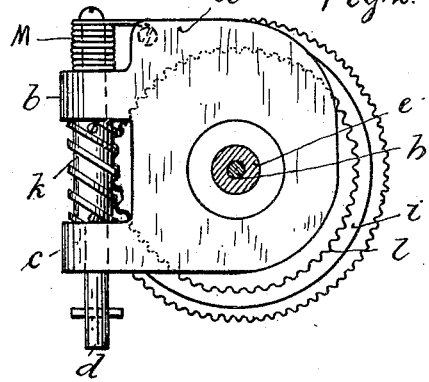
Emil Knecht
Inventor
By K. P. McElroy
Attorney and having a shaft wherein a
UNITED STATES PATENT OFFICE EMIL KNECHT, OF ERKNER, NEAR BERLIN, GERMANY, ASSIGNOR, BY MESNE ASSIGN-
MENTS, TO DUAL MOTORS LTD., OF LONDON, ENGLAND

ADJUSTABLE WINDING SPINDLE FOR SPRING MOTORS

Application filed March 26, 1928, Serial No. 264,837, and in Germany January 24, 1928.

This invention relates to improvements in spring motors; and it comprises spring motors adapted for actuating talking machines and the like and having a shaft wherein a spring winding spindle is adjustably supported upon a frame by means of a plate carrying said spindle and adapted to be rotated on and secured in adjustable position upon said shaft; all as more fully hereinafter set forth and as claimed.

In the accompanying drawing I have illustrated a typical embodiment of the present invention. In this showing:

Fig. 1 is a side elevation, partly in section; and

Fig. 2 is a plan view with the driving gear plate removed.

As shown, to the shaft $h$ of a spring motor $i$ is secured a worm wheel $l$, through which the spring can be wound. On said shaft above said wheel is a bushing $e$, the upper end of which is externally screw-threaded for the reception of a nut $f$. The bushing passes through a frame plate $g$ of the machine and the nut seats on the upper side of said plate. Between the lower side of said plate and a flange on the lower end of the bushing, is seated a plate $a$, which carries on one side bearings $b$ and $c$ for the winding spindle $d$. Between said bearings, said spindle carries a worm $k$ in mesh with the worm wheel $l$, so that, by rotating the spindle $d$, the spring of the motor is wound up. By loosening the nut $f$, the plate $a$ can be rotated around the axis of the spring motor, to bring the worm into the desired angular position, and then secured in such position by tightening said nut.

Any conventional form of spring pawl ratchet mechanism M may be used with this motor to prevent a reverse rotation of shaft $d$. As this ratchet mechanism constitutes no part of the invention a further description of the same is deemed unnecessary.

Various modifications may be made without departing from the scope of the invention.

What I claim is:

1. Means for adjusting winding spindles of spring motors of talking machines and the like in angular relation to the supporting frame, comprising the combination with a frame plate, of a spring motor shaft passing therethrough, a flanged bushing surrounding said shaft, a worm wheel on said shaft below said bushing, a plate rotatable on said bushing between the flange thereof and said frame plate, a nut on said bushing above said frame plate, bearings carried by said plate and a worm in mesh with said wheel.

2. Means for adjusting winding spindles of spring motors of talking machines and the like in angular relation to the stationary supporting frame, comprising a spring motor having a driving shaft, a stationary supporting frame, a flanged bushing on said driving shaft, a plate rotatable about the axis of the driving shaft and positioned on the bushing between the flange and the stationary supporting frame, bearings for the winding spindle carried by said plate and means including the bushing for clamping the rotatable plate to the stationary supporting frame in adjusted position.

In testimony whereof I affix my signature.

EMIL KNECHT.